United States Patent [19]  
Ogoro et al.

[11] 3,829,870  
[45] Aug. 13, 1974

[54] PHOTOGRAPHIC CAMERA

[75] Inventors: Masanobu Ogoro, Yokohama; Kiyoshi Takashi, Tokyo, both of Japan

[73] Assignee: Canon Kabushiki Kaisha, Tokyo, Japan

[22] Filed: May 16, 1973

[21] Appl. No.: 360,647

[30] Foreign Application Priority Data  
May 22, 1972 Japan.............................. 47-51091

[52] U.S. Cl. ............................................... 354/50  
[51] Int. Cl. ............................................. G03b 7/08  
[58] Field of Search ...................... 95/10 CT, 10 PO

[56] References Cited  
UNITED STATES PATENTS  
3,545,350  12/1970  Gross...................................... 95/10  
3,731,603   5/1973  Ono et al............................... 95/10  
3,731,604   5/1973  Fujii et al............................... 95/10

Primary Examiner—Samuel S. Matthews  
Assistant Examiner—Michael L. Gellner  
Attorney, Agent, or Firm—McGlew and Tuttle

[57] ABSTRACT

A photographic lens system provides an image of the photographic field of view at a focussing plane, such as a condenser lens. Two photoelectric devices are positioned closely adjacent the focussing plane to be responsive to the light of the image, with each device scanning a respective area of the image to provide a respective electrical output. The two photoelectric devices are connected in a bridge circuit including adjustable resistances for balancing the bridge circuit. A pair of transistors have their inputs connected to the output of the bridge circuit, and their outputs control a transistorized differential amplifier which, responsive to an unbalance of the bridge circuit, supplies a control signal to a switching network to energize a relay to close a control switch which energizes a shutter release of the camera to operate the shutter of the camera to take a picture. The picture is taken responsive to movement of an object in the photographic field of the lens system, or to entry of an object into the photographic field, either of these cases resulting in an unbalance of the bridge circuit. Instead of the pair of photoelectric devices, a plurality of photoelectric devices may be provided and can be connected into two sets, each included in a respective arm of the bridge circuit.

8 Claims, 3 Drawing Figures

PATENTED AUG 13 1974     3,829,870

PHOTOGRAPHIC CAMERA

FIELD AND BACKGROUND OF THE INVENTION

The present invention relates to a detector of variations taking place in the light measuring field when an object in the light measuring field happens to move or when a new object enters into the light measuring field.

An equipment to release a photographic shutter, when a detecting part detects the movement of an object crossing the photographing objective field of view has been known.

However such equipment of this kind has such a weak-point in that when the motion of the object is too slow or the object passes only a small part of the photographing objective field of view the shutter is not necessarily released, or that the shutter is released, although no object is detected, when the sun is hidden by clouds in the field of view of the photographing objective.

SUMMARY OF THE INVENTION

According to the present invention, a plurality of detecting elements are provided in the neighborhood of condensor lenses in such a manner that the photographing fields to be detected are divided into several parts, for example for a systematized camera with a TTL light measuring system. These detecting elements are connected into a bridge circuit along with variable resistances for balancing the bridge. The detecting elements detect the variation, from an initial light distribution, into a second light distribution which results in unbalance of the bridge circuit and the shutter is released by the output of the detecting elements. Therefore, when an object happens to move in or enters into, the photographing field, the bridge becomes unbalanced so that the shutter is released without fail regardless of the speed of motion of the object and of the position of the object in the photographing field. The present invention further provides an equipment, in which the shutter is never released in the case where the brightness of the entire photographing field varies, for example according to the weather, because then the bridge does not become unbalanced.

BRIEF DESCRIPTION OF THE DRAWINGS

Below the present invention will be explained according to the attached drawings.

FIG. 2–1 and FIG. 2—2 show respective arrangements of the detecting elements.

DESCRIPTION OF THE PREFERRED EMBODIMENTS

Figure 1:
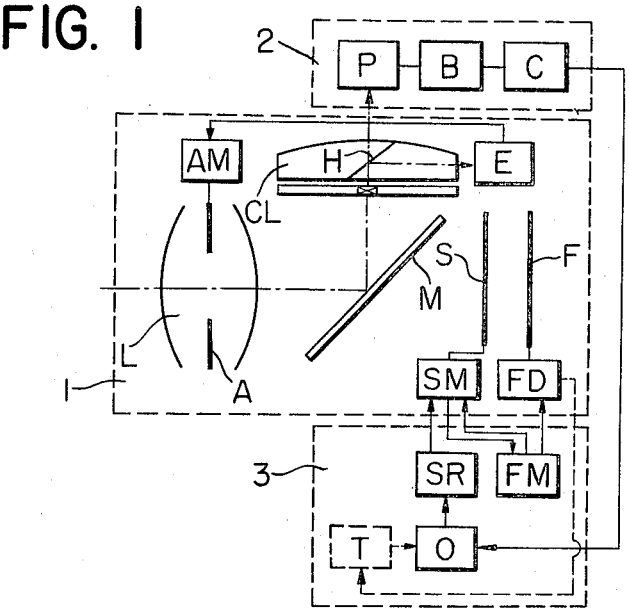
FIG. 1 is a block diagram of an embodiment of the camera according to the present invention.

In the drawing, the optics and the exposure device of the camera, with the finder removed, are generally indicated at 1. 2 is a device according to the present invention for providing a releasing signal and, in the present embodiment is so designed as to be mounted in the camera after removal of the finder device. An existing motor-drive device is generally indicated at 3, while L is a lens, A an aperture, M a reflecting mirror, CL a condensor lens, H a half mirror, E a light measuring element and AM an aperture adjusting device which is driven by the output of the light measuring element E. S is the shutter, while SM is a shutter driving mechanism. P is a detecting part, which, for example, as shown in FIG. 2–1 or FIG. 2–2 comprises a bridge network consisting of several detecting elements and variable resistances adjacent and above condensor lens CL.

Figures 1, 2:
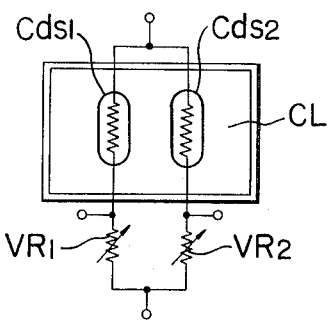
Figure 2:
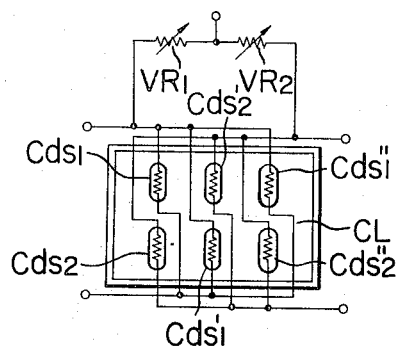

As to disposition of the detecting parts, two examples of the combinations of photoconductive elements $cds_1$, $cds_2$ etc. with variable resistances $VR_1$, $VR_2$ for adjusting the bridge network are shown in FIG. 2–1 and FIG. 2—2, but the detecting parts are not limited to these two examples. These detecting elements are provided directly behind the condensor lens and close to it, namely relatively near the focussing plane, so that each element scans a respective area of the image in the focussing plane to provide a respective output, thus dividing the photographing field into several parts. B is the amplifing network, while C is the switching network.

The above mentioned equipment is directed toward the object to be photographed, while the bridge network is balanced under the then existing light distribution. When a new object comes into the photographing field or an object in the photographing field moves, the distribution of the light is changed, which change is detected by the detecting part P, which gives out a signal, this signal is amplified by the amplifying network B to operate the switching network C.

The switch-on signal from the switching network C is supplied to the operator O of the motor-drive equipment 3, with which the shutter release mechanism SR is put in operation. Responsive to the release signal from element SR, the shutter driving mechanism is put in operation in such a manner that the shutter S is opened and the film F is exposed. When the shutter is then closed and the photographing is completed, the signal indicating completion of the operation of the shutter opening and closing mechanism SM is supplied to film driving mechanism FM, which is then put in operation. Thereby the film feeding mechanism FD and the shutter driving mechanism connected with drive FM simultaneously complete their operation in such a manner that the film is fed and the shutter driving mechanism is charged, whereupon the switch controlling the film driving mechanism is automatically opened. If a timer T is provided, the photographing is repeated with a certain time period of the timer as long as a signal is supplied to the detecting part P.

Figure 3:
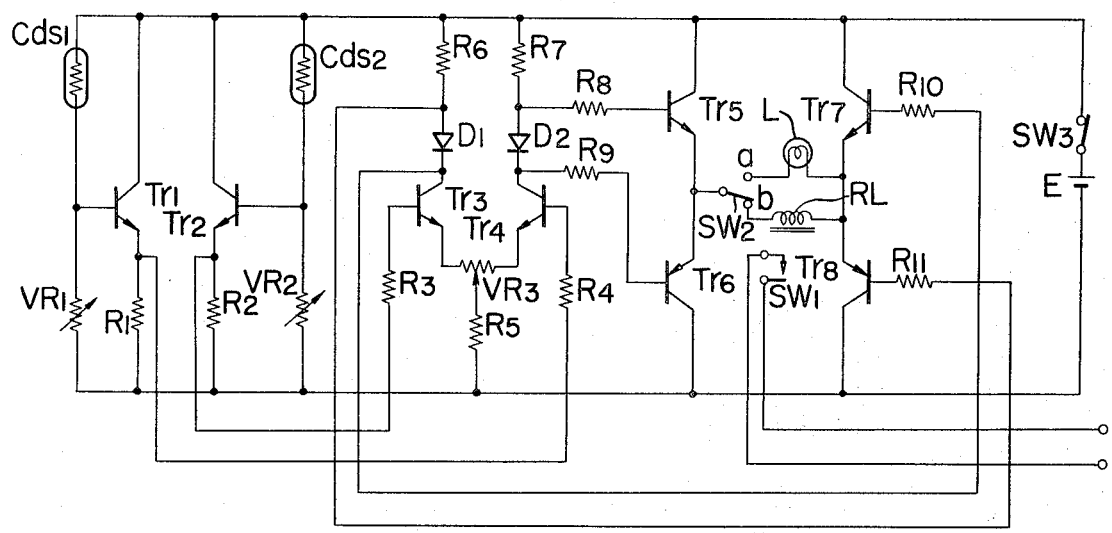
FIG. 3 is a schematic wiring diagram of a conventional camera combined with a motor-drive device, having a systematized TTL light measuring system.

FIG. 3 is a schematic wiring diagram of a network for providing a shutter release signal responsive to detection of variations of the circumstances in the field of view of the lens system of the camera. This system will now be described.

In FIG. 3, $cds_1$ and $cds_2$ are photoconductive elements for detection which carry out the partial light measuring in the photographing field, while $VR_1$ and $VR_2$ are variable resistances for balance setting, which are provided so as to balance the bridge consisting of $cds_1$, $cds_2$, $VR_1$ and $VR_2$ according to the distribution of light in the photographing field. $Tr_1$ and $Tr_2$ are transistors connected as emitter followers. $Tr_3$ and $Tr_4$ are transistors forming a differential amplifying network, while $D_1$ and $D_2$ are diodes, RL a relay arranged to close the switch SW1 of the shutter release. For example, with switch SW1 closed, the shutter is opened through the operator O in the motor driving equipment. $Tr_5$, $Tr_6$, $Tr_7$ and $Tr_8$ are transistors for driving the relay RL.

The cathode of the diode $D_1$ is connected to the base of the transistor Tr7 through the resistance 10, while the anode is connected to the base of the transistor Tr8 through the resistance 11. Likewise the anode and cathode of the diode $D_2$ are connected to the bases of the transistors $Tr_5$, $Tr_6$, respectively the respective resistances $R_8$, $R_9$.

The electric potential across diodes $D_1$ and $D_2$ is so chosen as to be half as high as that of the electric source, while each of the transistors $Tr_5$, $Tr_6$, $Tr_7$ and $Tr_8$ is in the cut-off state. Resistance $VR_3$ is the adjusting resistance for the differential amplifing network consisting of the transistors $Tr_3$ and $Tr_4$. Furthermore, a lamp L' is connected to a contact $a$ selectively engageable by a switch SW2 which may also selectively engage a contact $b$ connected to one terminal of relay RL. Thus, the network may be selectively switched to energize either the lamp L' or the relay RL.

The operation will now be explained. With the main switch $SW_3$ closed or on, the balance of the network is adjusted according to the then distribution of the light by means of the variable resistances $VR_1$ and $VR_2$. When the bridge balance the lamp L is put out. When the distribution of the light differs, due to the movement of an object in the photographic field, from that when the bridge is brought in balance, the value of the resistances of the photoconductive elements $cds_1$ and $cds_2$ is changed in such a manner that the bridge becomes unbalanced and there is a difference between the output transistors $Tr_1$ and $Tr_2$. This difference between the outputs is applied to the bases of transistors $Tr_3$ and $Tr_4$, amplified there to provide the collector outputs of transistors $Tr_3$ and $Tr_4$. By means of the difference of the collector potentials of transistors $Tr_3$ and $Tr_4$ either the combination of transistors $Tr_5$ and $Tr_8$ or that of transistors $Tr_6$ and $Tr_7$ is switched-on and the switch $SW_1$ is closed by relay RL to provide a signal and means of this signal, the shutter is released and the variation in the photographing field is recorded.

While FIG. 3 illustrates only a single respective photoconductive element connected to the base of each of the two transistors Tr1 and Tr2, plural photoconductive elements can be arranged in two sets, with the elements in each set being connected in parallel with each other, and each set can be substituted for one of the single photoconductive elements shown in FIG. 3. Further the diodes $D_1$, $D_2$ are intended to stabilize the relay operating network consisting of transistors $Tr_5$, $Tr_6$, $Tr_7$ and $Tr_8$, preventing the electric potential thereacross being changed due to the alternation of the input into the amplifying network constituted by transistors Tr3 and Tr4. These diodes can be replaced with resistances or can entirely be omitted. While in, the explanation, photographing is refered to, it is also possible to operate alarm apparatus with the switch-on signal of the relay RL.

With the present invention as described above, photographing takes place only when any variation takes place in the photographing field. Further, photographing does not take place with the variation of weather in the outdoor, and films are not waste in rain, so that the invention is very useful for the alarming device in banks or the like or for the biological observation of animals or botanies.

What is claimed is:

1. A photographic camera, operated by detection of movement in the photographic field, comprising, in combination, a photographic lens system; means providing an image of the field of view of said lens system at a focussing plane; a pair of photoelectric arrangements positioned closely adjacent said focussing plane to be responsive to the light of the image, each photoelectric arrangement scanning a respective area of the image to provide a respective electrical output; a comparison network including the outputs of said pair of photoelectric arrangements as its input and including output means providing an output signal responsive to unbalance of the outputs of said photoelectric arrangements; a camera shutter; a shutter drive connected to said shutter; a shutter release controlling said shutter drive; and operating means connected to said comparison network output means and to said shutter release and operable, responsive to an output signal of said output means, to operate said shutter release.

2. A photographic camera according claim 1 characterized in that said photoelectric arrangements are arranged symmetrically to the center of said focussing plane.

3. A photographic camera, as claimed in claim 1 characterized in that said light receiving elements are photoconductive cells.

4. A photographic camera, as claimed in claim 1, in which said comparison network includes a bridge circuit constituted by said pair of photoelectric arrangements and a pair of bridge balancing adjustable resistances operable to balance said bridge when there is no movement in the photographic field; a bridge circuit unbalanced detecting network connected across the output terminals of said bridge circuit; said detecting network forming part of said comparison network and said comparison network further including a control network connected to said detecting network and including said comparison network output means.

5. A photographic camera, as claimed in claim 4, in which said photoelectric arrangements comprise equal numbers of photoconductive elements connected in parallel with each other; said adjustable resistances each being connected, at a junction point, to a respective photoelectric arrangement; said control network being connected to said junction points.

6. A photographic camera, as claimed in claim 1 in which said photoelectric arrangements comprise equal numbers of photoelectric elements, said photoelectric elements being arranged in a matrix in which each photoelectric element scans a respective area of the image, the scanned areas being equal to each other; the respective photoelectric elements of each photoelectric arrangement being connected in parallel with each other to form a respective arm of a bridge circuit included in said comparison network.

7. A photographic camera, as claimed in claim 1, in which said control network includes a switching network; said switching network including a pair of differential networks having respective outputs; a pair of first switching means having outputs connected in series with each other at a respective junction point and inputs connected to the output of one differential network; a pair of second switching means having outputs connected in series with each other at a respective junction point and inputs connected to the output of the other differential network; the output of each differential network including, in series, a respective rectifier; the inputs of said first switching means being connected to respective terminals of the rectifier of said one differential network and the inputs of said second switching means being connected to respective terminals of the rectifier of the other differential network; said operating means comprising a relay coil connected between the respective junctions of said first and second switching means, and a switch operable, upon energization of said relay means, to operate said shutter release.

8. A photographic camera, as claimed in claim 1, in which said means providing an image of the field of view of said lens system comprises a condenser lens positioned in the path of light entering through said lens system; each photoelectric arrangement including at least one photoconductive element positioned adjacent said condenser lens, the number of photoconductive elements in each photoelectric arrangement being equal to each other; said comparison network including a bridge circuit including said photoelectric arrangements each connected in series with a respective adjustable resistance for balancing of said bridge circuit when there is no movement in the field of view of said lens system; a pair of first transistors each connected as an emitter-follower and each having a base connected to a respective junction of a photoelectric arrangement and the associated adjustable resistance; said comparison network further including a differential amplifier comprising a pair of second resistors each having a base connected to the emitter of a respective first transistor, a collector and an emitter; an adjustable resistance interconnecting the emitters of said second transistors; first and second diodes each connected in the collector circuit of a respective second transistor; a pair of third transistors having their bases connected to respective opposite polarity terminals of said first diode and having their output circuits connected to each other at a first junction point; a pair of fourth transistors each having a base connected to a respective opposite polarity terminal of said second diode and their output circuits connected in series with each other at a second junction point; said operating means comprising a relay winding connected between said first and second junction points and a switch operable by said relay winding to operate said shutter release.

* * * * *